United States Patent Office 2,754,131
Patented July 10, 1956

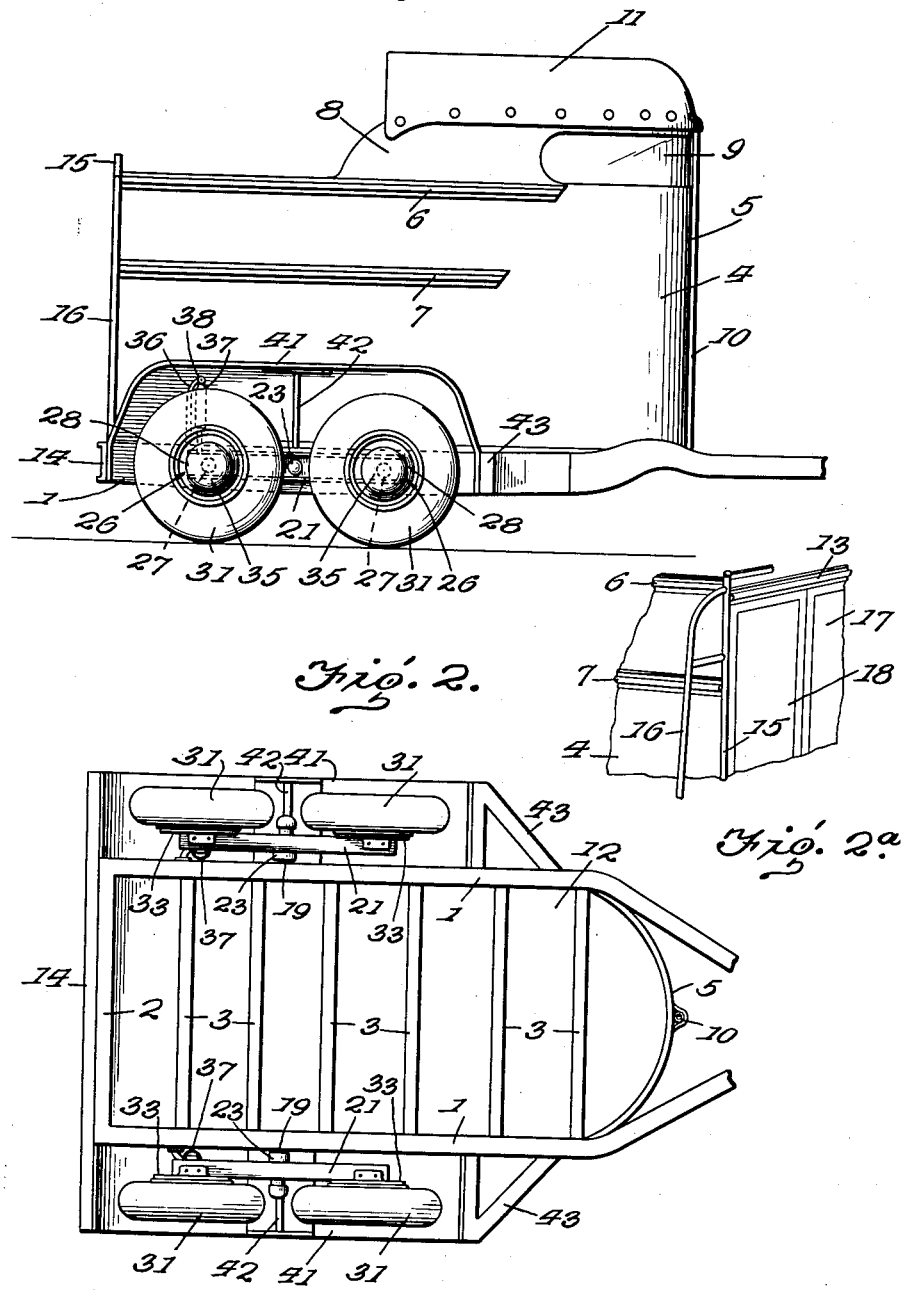

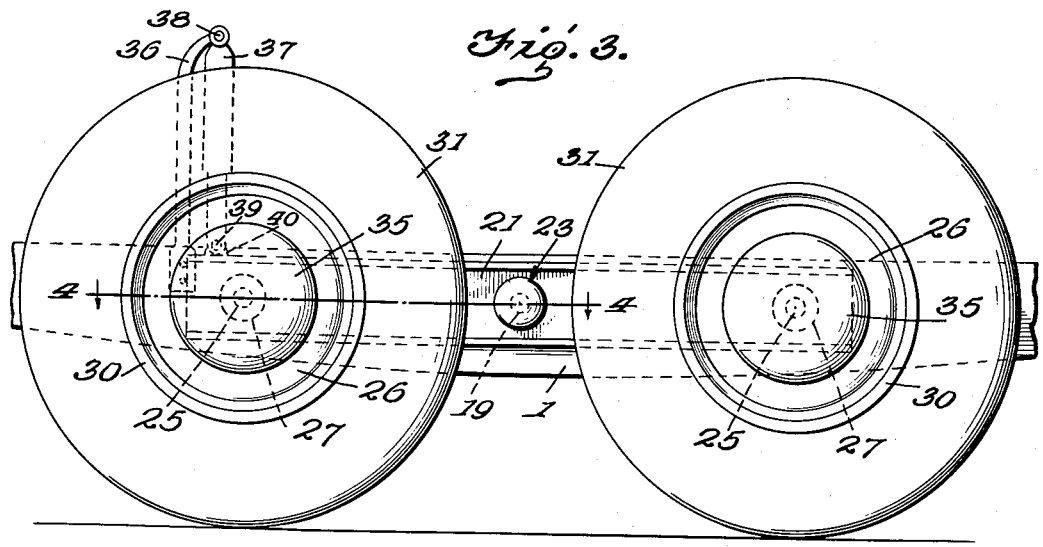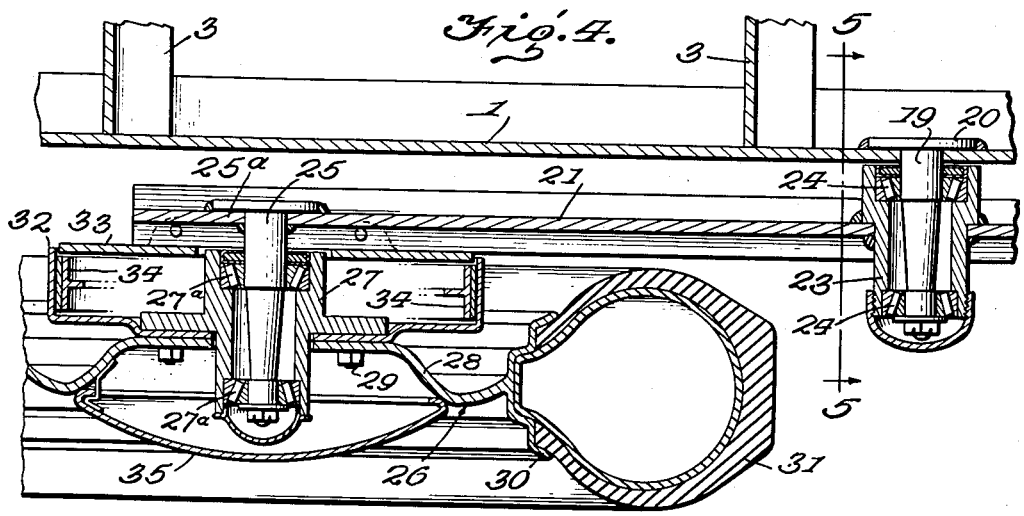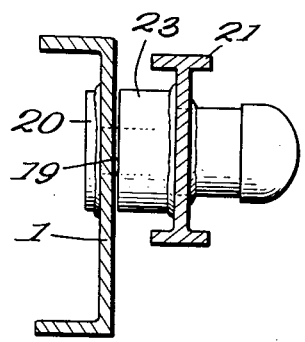

2,754,131

TANDEM WHEEL AXLE MOUNTING FOR TRAILER

Glenn P. Tulin, Bayfield, Colo.

Application March 3, 1954, Serial No. 413,794

1 Claim. (Cl. 280—104.5)

The invention relates to new and useful improvements in a trailer and more particularly a trailer which is adapted for drayage use.

An object of the invention is to provide a trailer which is simple in construction and consists of few parts the major portion of which are of standard construction which trailer is strong and durable and capable of heavy duty use.

In the drawings:

Figure 1 is a side view of a trailer embodying my improvements;

Figure 2 is a bottom plan view of the same;

Figure 2a is a perspective view of a portion of the rear of the body;

Figure 3 is a side view of a portion of the base structure of the trailer and showing the wheel structure and its mounting on the base structure;

Figure 4 is a sectional view on the line 4—4 of Figure 3; and

Figure 5 is a sectional view on the line 5—5 of Figure 4.

The improved trailer includes a supporting base structure made of channel bars extending along the side thereof and angle bars extending from one channel bar to the other and welded or otherwise secured thereto. Mounted on this supporting base structure is a body which may be of any desired shape depending upon the use of the trailer. Mounted on the side channel bars intermediate the ends thereof are outwardly extending spindles. These spindles are provided with a rigid base which is welded or bolted to the channel members. Mounted for oscillation on each spindle is a wheel supporting bar. The wheel supporting bar is provided with a hub and is mounted on roller bearings on the spindle. The mounting hub for the wheel supporting bar is located midway between the ends thereof and mounted on each end of the wheel supporting bar and projecting outwardly therefrom is a wheel spindle. The wheel spindle has an intgeral base member which is welded or bolted to the wheel supporting bar and mounted on each spindle is a wheel provided with an inflated tire. Attached to each channel member adjacent the rear end of the wheel supporting bar is an upstanding bracket. A shock absorber is secured at its upper end to the upper end of the bracket and at its lower end to the wheel supporting bar. This shock absorber dampens and limits the oscillations of the wheel supporting bar on the supporting spindle carried by the supporting base structure.

Referring more in detail to the drawings, the improved trailer includes a supporting base structure which is provided with channel bars 1, 1 extending along the sides thereof. A channel bar 2 connects the rear ends of the side channel bars. Extending across from one channel bar to the other are angle bars 3, 3. These angle bars and channel bars are all preferably secured by welding so that a very rigid base structure for the trailer is thus provided. Mounted on this base structure is a body 4.

The body 4 is shaped to adapt the trailer for the particular use to which it is to be employed.

As shown in the drawings, the trailer is provided with a body dimensioned so that two horses may be placed in the trailer body for transportation. The body includes side members preferably formed of sheet metal. The forward end of the body is curved, as indicated at 5.

In order to reinforce the side walls of the body, U-shaped channel bars with flanges are provided and spot welded to the body wall. In Figure 1, there is shown an upper reinforcing bar 6 and a lower reinforcing bar 7. Other reinforcing bars may be used.

Each side wall is provided with an extension 8. The extension 8 is cut away so as to provide an opening 9 which may if desired be closed with any suitable transparent closure member. In the middle of the front end is a reinforcing tubular member 10 which extends from the floor structure to the extension 8 and supports the forward end of the portion of the extensions which extend around the front and join the two extensions. Attached to these extensions is a canopy 11. This is the only closure feature for the top of the body. The canopy covers the heads of the horses when the trailer is used for transporting horses.

The body includes a suitable floor 12 which is secured to the side walls and also secured to the channel members. These channel members at the front end are extended and connected so that the trailer may be attached to a conveying means therefor.

Extending across from one side to the other of the body at the rear thereof is an upper channel member 13 and at the bottom of the body is a channel member 14. Extending up along the sides of the body wall are tubular members 15, 15 which are reinforced by a bracket structure indicated at 16. This makes a very durable support for the body walls and prevents the same from flexing inwardly or outwardly. It also makes a framework so that doors, if desired, may be used for closing the rear end of the trailer. As shown in Figure 2a, there are doors 17 and 18 for this purpose.

Mounted on each channel member 1 is a bar supporting spindle 19. This supporting spindle is provided with a flange base 20. It extends through the vertical wall of the channel member and is welded to the inside of said channel member. A wheel supporting bar in the form of an I-beam 21 is mounted on this spindle 19, adjacent and parallel the base channel 1 carrying the particular spindle 19. Rigidly attached to the bar 21 is a hub member 23 and this hub member is mounted on suitable roller bearings 24 carried by the spindle 19. This hub 23 is located midway between the ends of the wheel supporting bar. It will be noted by reference to Figures 1 and 3 of the drawings that the bar supporting spindles 19 are disposed in the plane of the base structure including the side channel bars 1.

At each end of the wheel supporting bar is a wheel supporting spindle 25. These spindles are alike in construction and the description of one will answer for the other. The spindle 25, Figure 4, is provided with a rigid supporting base 25a. The spindle extends through an opening in the vertical section of the I-beam and is welded to the inner face thereof. Mounted on each spindle is a wheel 26. The wheel includes a hub 27 which is mounted on suitable roller bearings 27a carried by the spindle 25.

The disc 28 of the wheel 26 is secured to the hub by means of bolts 29. The disc 28 carries the usual rim 30 on which a tire 31 of the usual inflated type is mounted.

Under some uses of the trailer, it may be desired to provide a braking mechanism and there is shown in Figure 4 a brake drum 32 which is rigidly attached to the hub of the wheel. There is also shown a plate 33 attached to the wheel supporting bar 21 which closes the inner side of the brake drum. Mounted within this brake drum are brake shoes 34. The mechanism for operating the brake shoes is of the usual construction and is not illustrated.

The wheel 26 is provided with the usual dust cap 35. Most of the features of the wheel and the roller bearings for mounting the same and even the supporting spindle are of standard construction and further description thereof is not thought necessary. The same is true of the hub 23 which supports the bar carrying the wheels. This likewise is of standard construction. The same is true of the braking mechanism.

Attached to the channel member 1 at each side of the supporting base structure is an upstanding bracket 36. This bracket is bolted to the channel bar and is bent laterally at its upper end. A shock absorber 37 of the usual construction is pivoted at its upper end to the bracket at 38. It is pivoted at its lower end at 39 to a lug 40 attached to the wheel supporting bar. This shock absorber dampens and limits the oscillations of the wheel supporting bar on the spindle 19.

The trailer described above in detail is simple in construction and consists of few parts most of which are of standard production. The supporting base structure is made of channel members and angle bars and the body carried thereby is made of sheet metal and most of the parts are joined preferably by welding. The body is mounted on wheels at each side thereof which are carried by an I-shaped supporting bar and this supporting bar in turn is carried by a usual roller bearing spindle rigidly attached to the side channel bars intermediate the ends thereof. The oscillations of the wheel supporting bar are dampened and limited by a shock absorber of the usual construction. When it is desired, the wheel is equipped with a braking means which may be also of standard construction.

The body at each side thereof is provided with a fender 41 which is attached to the channel bar and extends over the wheels. The fender is supported centrally thereof by a bracket member 42. At the rear end the fender is attached to the channel bar 14 and at its front end the fender is attached to an inserted bracket 43 which is welded to the side channel members.

It is obvious that minor changes in the details of construction and arrangement of the parts may be made without departing from the spirit of the invention as set forth in the appended claim.

I claim:

A trailer comprising a base structure formed of side channel bars and cross angle bars rigidly connected, a body supported thereon, a bar supporting spindle rigidly connected to each side channel bar intermediate its ends and projecting outward therefrom, said bar supporting spindles being disposed in the plane of said base structure, a wheel supporting bar mounted on each bar supporting spindle and disposed adjacent and parallel the base structure channel bar to which said spindle is connected, wheel supporting spindles rigidly mounted adjacent the ends of the wheel supporting bars, a wheel mounted on each wheel supporting spindle, an upstanding bracket carried by each side channel bar near one end of the adjacent wheel supporting bar and a shock absorber pivotally secured to each said bracket at its upper end and pivotally secured to the adjacent wheel supporting bar at its lower end for dampening and limiting the oscillations of said adjacent wheel supporting bars on the spindles carried by the base structure side channel bars.

References Cited in the file of this patent

UNITED STATES PATENTS

| 2,029,756 | Davis | Feb. 4, 1936 |
| 2,044,278 | Buquor | June 16, 1936 |
| 2,122,839 | Guy | July 5, 1938 |
| 2,255,357 | Hawthorne | Sept. 9, 1941 |
| 2,260,574 | Martin | Oct. 28, 1941 |
| 2,298,282 | Brown | Oct. 13, 1942 |

FOREIGN PATENTS

| 490,858 | Germany | Feb. 1, 1930 |